United States Patent [19]
Clary

[11] Patent Number: 6,102,321
[45] Date of Patent: Aug. 15, 2000

[54] LINE SLACK REMOVING DEVICE

[76] Inventor: Thomas A. Clary, Pinal Ranch, Miami - Superior Hwy. P.O. Box 2513, Globe, Ariz. 85502

[21] Appl. No.: 09/229,878

[22] Filed: Jan. 14, 1999

Related U.S. Application Data

[60] Division of application No. 08/871,864, Jun. 9, 1997, which is a continuation-in-part of application No. 08/650,604, May 20, 1996, abandoned.

[51] Int. Cl.$^7$ ............................. B65H 75/38; D06F 53/00
[52] U.S. Cl. ................................... 242/388.4; 211/119.15
[58] Field of Search ............................. 242/388.1, 388.2, 242/388.4; 211/119.15

[56] References Cited

U.S. PATENT DOCUMENTS

| | | | |
|---|---|---|---|
| 1,469,112 | 9/1923 | Schoonover | 242/388.2 |
| 2,710,998 | 6/1955 | Meighan et al. | 242/388.2 |
| 3,768,779 | 10/1973 | Garretson | 254/213 |
| 5,255,866 | 10/1993 | Campolo | 242/388.1 |

*Primary Examiner*—John Q. Nguyen
*Attorney, Agent, or Firm*—Cahill, Sutton & Thomas P.L.C.

[57] ABSTRACT

A line in contact with an elongated mandrel has incremental lengths wrapped around the mandrel when the mandrel is rotated about a longitudinal axis. The mandrel has at least one transverse handle receiving opening therethrough. The handle when inserted into the handle receiving opening is employed to rotate the mandrel. The device includes at least one member for engaging the line to prevent unwinding rotation of the mandrel. The mandrel carries spaced transverse flange plates to prevent the line from sliding off the mandrel. At least one of the flange plates has oppositely extending slots from the periphery of that one flange plate to an area near the mandrel for admitting the line from which slack is to be removed to be led into and out of the space between the flange plates to contact the mandrel.

4 Claims, 6 Drawing Sheets

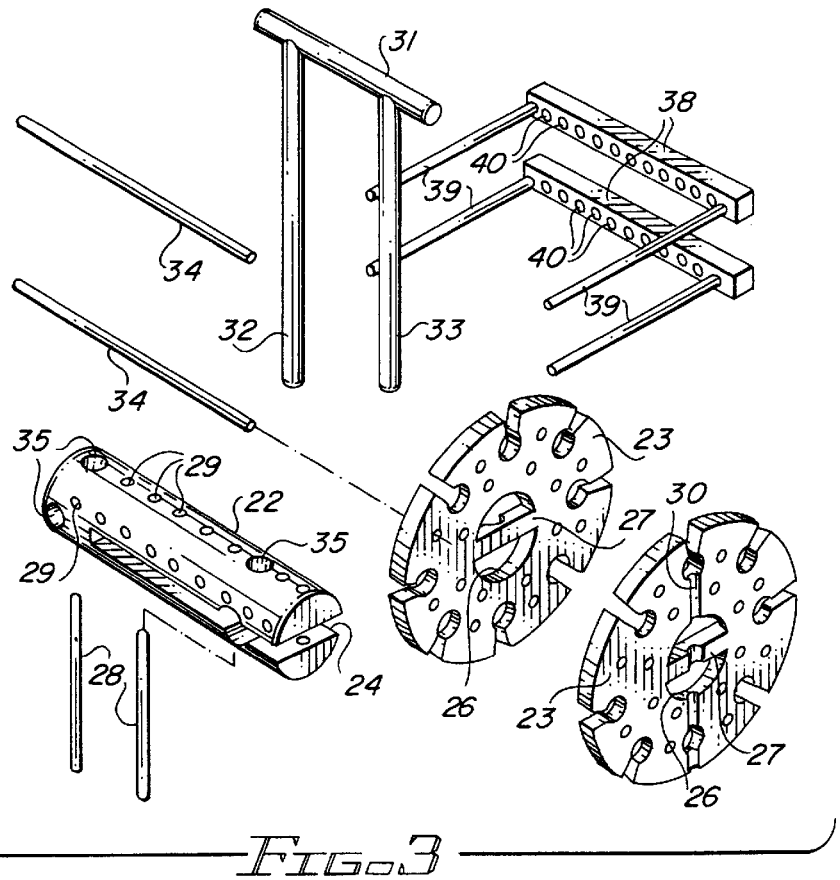
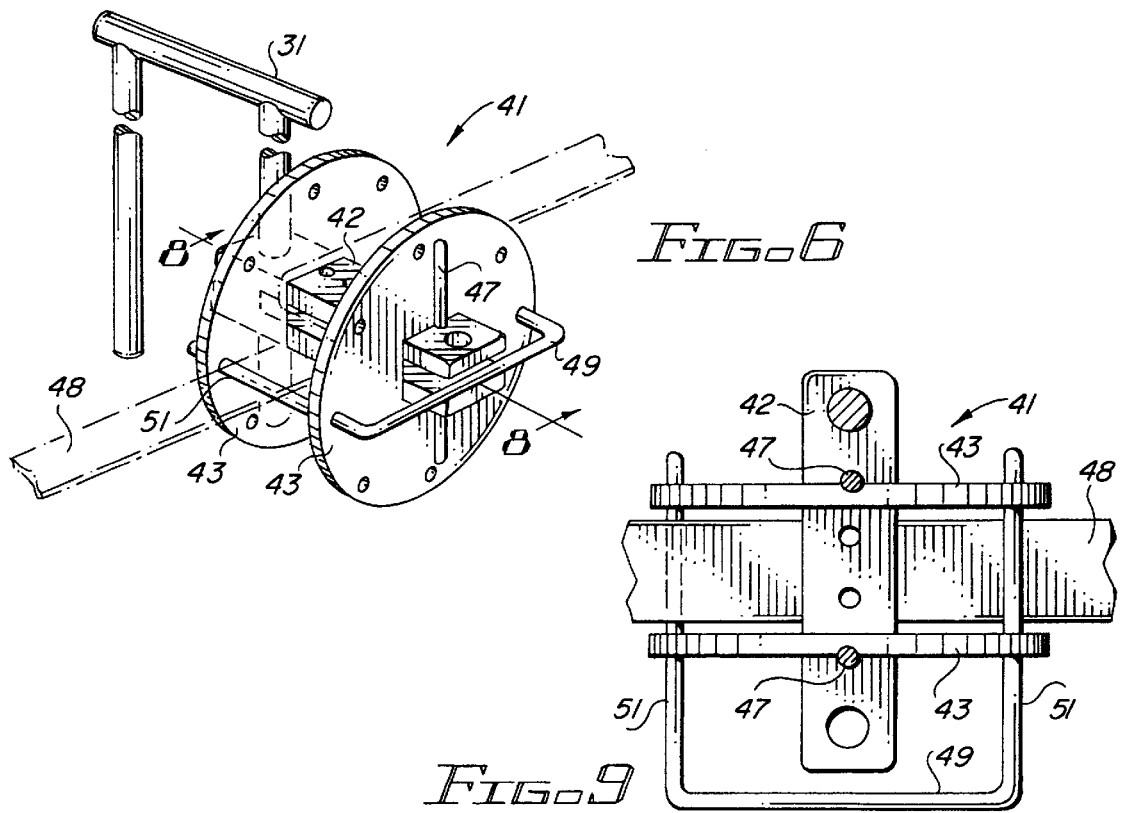

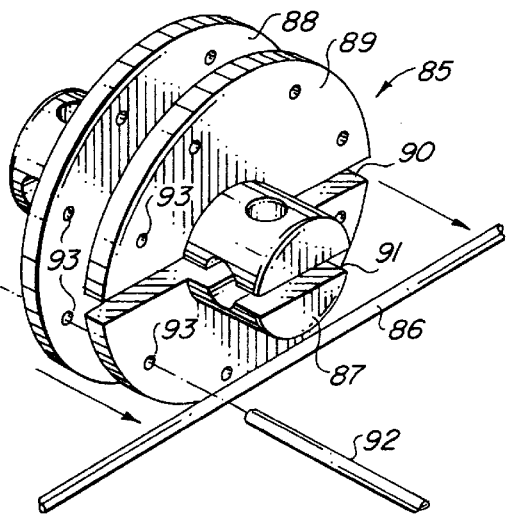

FIG. 17

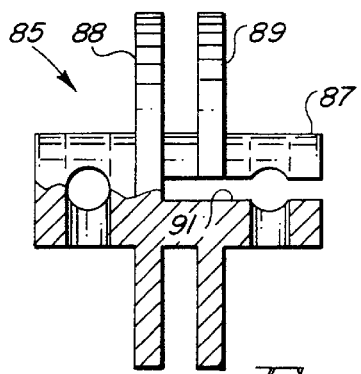

FIG. 18

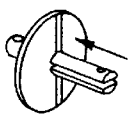
INSERT POSITION PIN & SLIDE FLANGE PLATE 1 ONTO SLOTTED MANDRELL

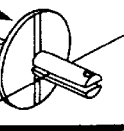
SLIDE MANDRELL ONTO WIRE (OR CABLE OR TAPE) TO BE TIGHTENED

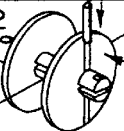
SLIDE FLANGE PLATE 2 ONTO MANDREL. INSERT POSITION PIN IN TO SLOT OF FLANGE PLATE 2

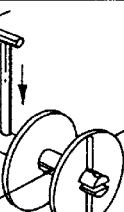
INSERT ONE PRONG OF HANDLE INTO LARGE HOLE IN MANDREL END. TURN HANDLE (SEE ARROW) TO START TIGHTENING

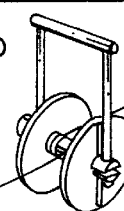
WHEN WIRE IS TIGHT, PIVOT HANDLE 180° SO THAT OUTSIDE PRONG CAN BE INSERTED IN HOLE IN MANDRELL OUTSIDE OF FLANGE PLATES FOR FINAL TIGHTENING

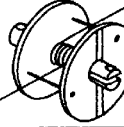
INSERT ANTI-ROTATE PIN 1 ABOVE WIRE & PIN 2 BELOW WIRE. REMOVE HANDLE

FIG. 4

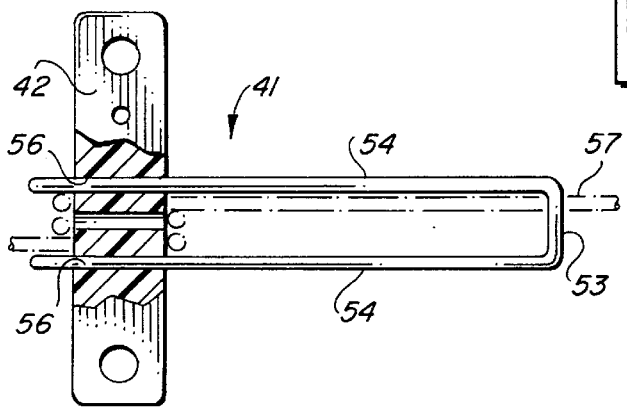

FIG. 10

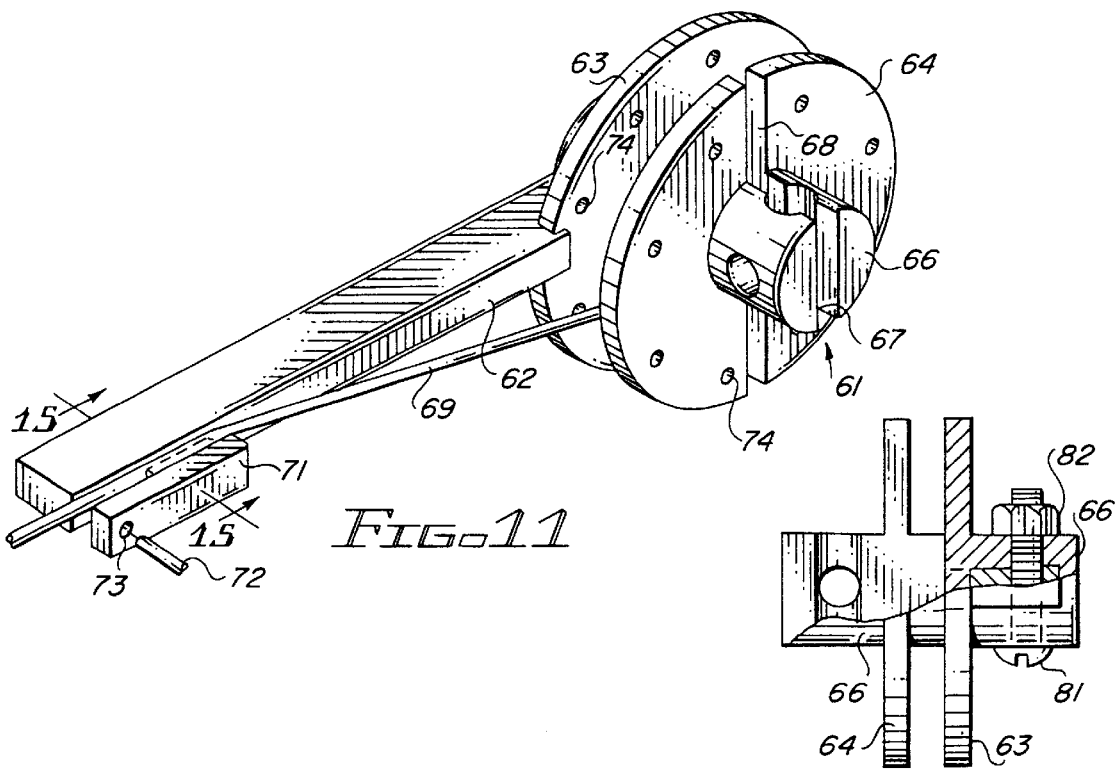
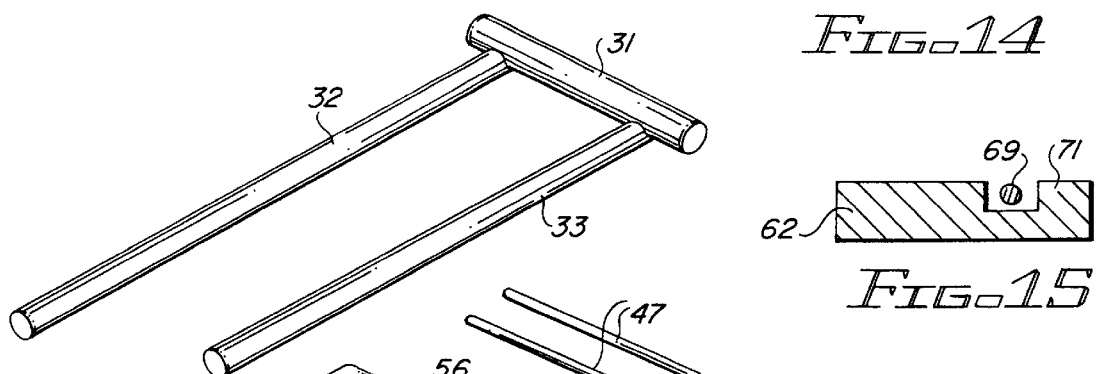
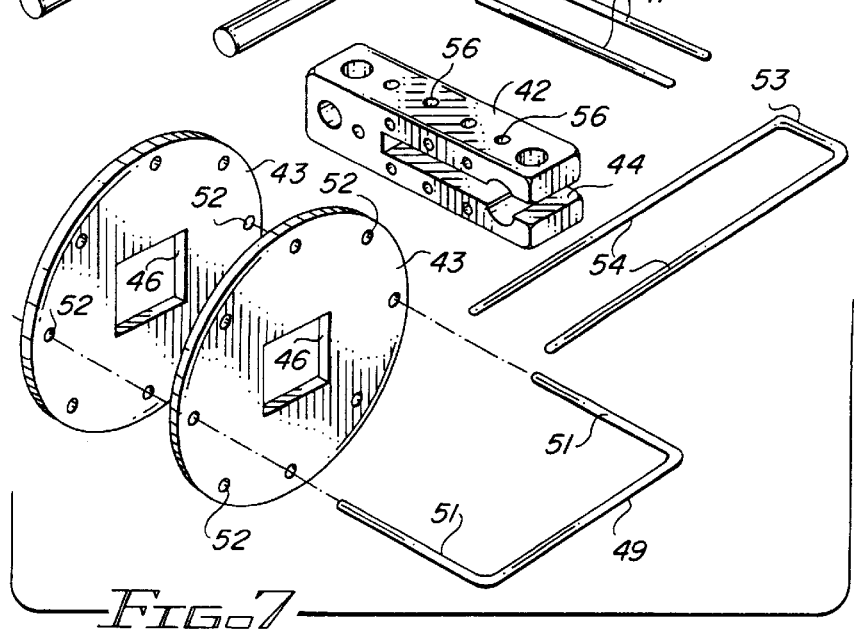

LINE SLACK REMOVING DEVICE

This application is a division of application Ser. No. 08/871,864 filed Jun. 9, 1997 which in turn was a continuation-in-part of application Ser. No. 08/650,604 filed May 20, 1996 and now abandoned.

TECHNICAL FIELD

This invention is concerned with removing slack from elongated flexible lines such as a clothes line, fence wire and tie down straps.

BACKGROUND ART

Numerous inventors have devised a variety of line slack removing devices.

U.S. Pat. No. 430,581 granted Jun. 17, 1890 to C. M. Kiler for "Wire Tightener" discloses one such device which is intended to be manipulated by a complex and expensive worm gear crank.

W. J. Miller in his U.S. Pat. No. 1,982,444 granted Nov. 27, 1934 for "Line Tightener" discloses a slack remover which is manipulated by a separable handle. The arrangement is such however that the device can be turned with the handle through less than 180°, thereby limiting the amount of slack that can be taken up with each throw of the handle.

U.S. Pat. No. 1,261,505 granted Apr. 2, 1918 to J. F. Fitzsimmons for "Clothes Line Tightener" discloses another such device. The Fitzsimmons device is simple and fairly effective for light weight clothes lines but lacks the versatility to be used on heavier wire such as barbed wire fencing.

J. E. Leath in his U.S. Pat. No. 4,057,221, granted Nov. 8, 1977 for "Wire Tightening Tool" discloses two heavier duty slack removers with removable handles for manipulating the tools. The Leath tools were more difficult to fabricate and awkward to use.

U.S. Pat. No. 4,700,434, granted Oct. 20, 1987 to D. G. Fambrough for "Line Tightening Mechanism" discloses a spool type slack remover with a hexagonal projection which is engageable by a wrench to turn the slack remover. Rotating the slack remover with a wrench can be awkward.

Dare Products, Inc., Battle Creek, Mich. has produced a molded plastic wire tightener which functions in much the same manner as the Fambrough mechanism.

There continues to be a need for a slack remover which is both versatile and reliable in operation.

DISCLOSURE OF THE INVENTION

This invention provides a slack removing device which employs an elongated mandrel for contacting a line to be tightened. In one embodiment the mandrel has a longitudinal slot extending from one end thereof toward the other end thereof. The slot is adapted to receive the flexible line to be tightened. The mandrel of the slack remover further has an opening extending transversely therethrough to receive a prong of a handle for rotating the mandrel about its longitudinal axis to cause marginal lengths of the line to become wrapped about the mandrel.

It is contemplated that the mandrel may also have a second handle receiving opening extending transversely through the mandrel. A two pronged handle can be inserted in these two handle receiving openings and the mandrel rotated thereby by a force applied directly above or below the line. This arrangement provides for forcefully tightening the line without twisting the slack removing device.

Further embodiments of the invention include adjustable flange plates mounted on the mandrel for accommodating lines of different widths.

In another embodiment the flange plates are fixed on the mandrel and one of those plates has a transverse slot therethrough which is in alignment and communication with a slot in the mandrel. This arrangement permits the line from which slack is to be removed to pass through the slot in the mandrel and the slot in the one flange plate to a position in the mandrel slot between the two flange plates.

In yet another embodiment at least one flange plate has a transverse slot extending from its periphery to a region close to the mandrel. The line from which slack is to be removed enters the space between flange plates through this slot to contact and be wound around the mandrel.

BRIEF DESCRIPTION OF THE DRAWINGS

The invention is described in greater detail hereafter by reference to the accompanying drawings wherein:

FIG. 3 is an exploded perspective view of a kit containing the components of the slack removing device of FIG. 1;

FIG. 4 is a pictorial sequence showing assembly and use of the device of FIG. 1;

FIG. 6 is a perspective view of another embodiment of the slack removing device;

FIG. 7 is an exploded perspective view of a kit including the components of the device of FIG. 6;

FIG. 9 is a top view of the device of FIG. 6;

FIG. 10 is a top view of another device constructed from the components illustrated in FIG. 7, partially in section and showing another means for preventing the device from unwinding;

FIG. 11 is a perspective view of another embodiment of the slack removing device of this invention;

FIG. 14 is an end view, partially in section of the device of FIG. 11;

FIG. 15 is a sectional view through the handle of the device of FIG. 11, taken as indicated by line 15—15 in FIG. 11;

FIG. 17 is a perspective view of another embodiment of the slack removing device of this invention;

FIG. 18 is an end view, partially in section of the device of FIG. 17.

BEST MODES FOR CARRYING OUT THE INVENTION

Figure 1:
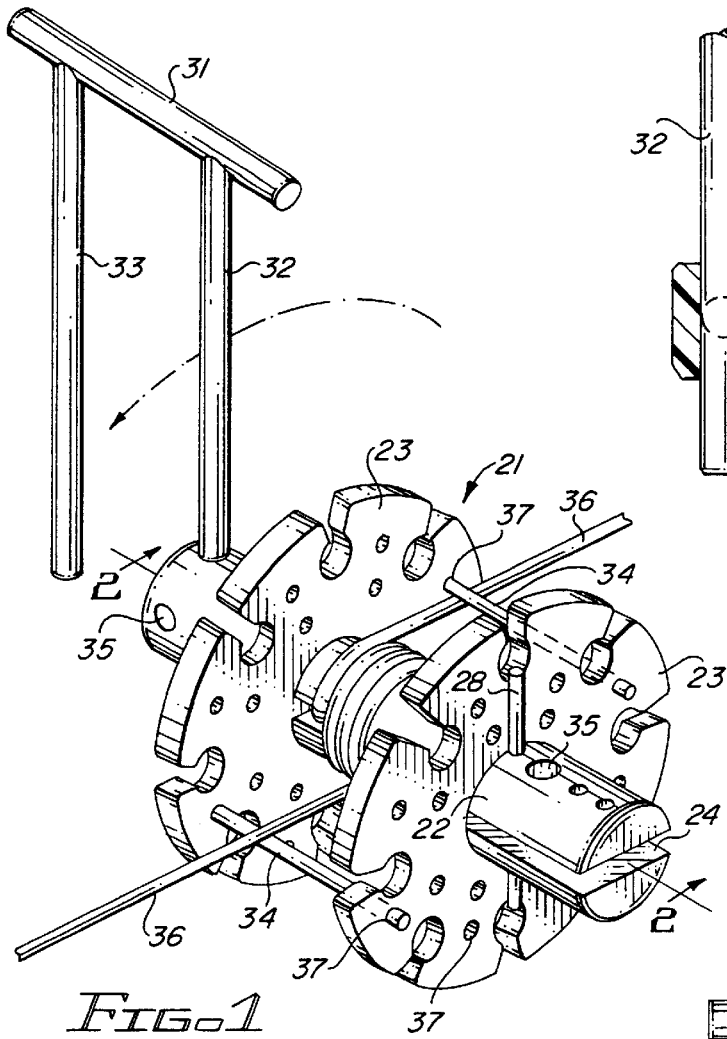
FIG. 1 is a perspective view of one embodiment of the invention illustrating its use in removing slack from a line.
Figure 2:
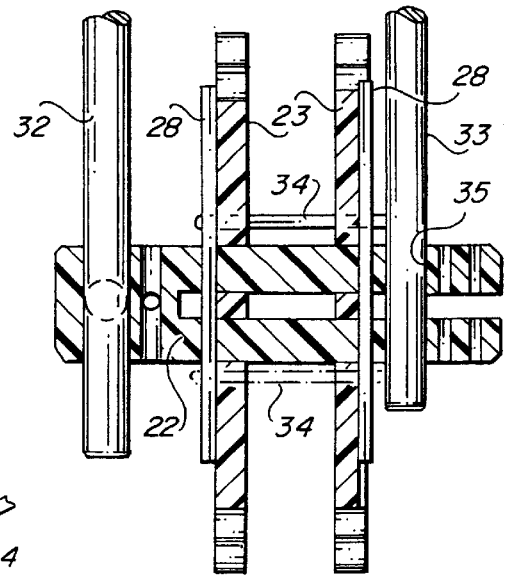
FIG. 2 is a sectional view through the slack removing device of FIG. 1 taken generally as indicated by line 2—2 in FIG. 1.

The slack removing device illustrated in FIGS. 1 to 5 and indicated generally by reference numeral 21 is assembled from the kit illustrated in FIG. 3 and used in the manner illustrated in FIGS. 1, 2, 4 and 5.

The principal components of the slack removing device 21 include an elongated cylindrical mandrel 22 and a pair of disc-like flange, or end, plates 23. The mandrel 22 has an elongated, diametrically disposed slot 24 extending from one end of the mandrel toward the opposite end thereof. The width of mandrel slot 24 is sufficient to accommodate the diameter or thickness of the line from which slack is to be removed.

It should be understood that the term "line" as used here and in the appended claims is a generic term including such elongated flexible members as wire or woven line such as may be employed as a clothesline, wire or barbed wire as used in fencing and flat metal and cloth tape as used in bindings.

Because the kit illustrated in FIG. 3 is intended to assemble a variety of slack removing devices useful with the variety of "lines" described above it is desirable that the flange plates 23 be adjustably positioned on the mandrel 22 so that the space between the plates can be varied. Each flange plate 23 has a central opening 26 which is slightly larger in diameter than the diameter of the mandrel 22. The opening 26 in each flange plate 23 is spanned by a diametrically disposed web 27 sized to fit slidingly within the mandrel slot 24. The openings 26 and the webs 27 in the flange plates 23 permit the plates to be slid into a desired position on mandrel 22. The flange plates are fixed in position by a pair of position pins 28 which are insertable in openings 29 in mandrel 22. Openings 29 are arranged in rows along the length of mandrel 22 and several rows are spaced around the mandrel. Thus, there are provided a plurality of openings 29 along and around the mandrel 22 permitting multiple placement of the position pins 28 and the flange plates 23. If desired, the faces of flange plates 23 may be provided with diametrical recesses 30 for receiving the position pins 28.

The slack removing device 21 is manipulated by a handle 31 having a pair of elongated prongs 32 and 33. Handle prongs 32 and 33 are sized and spaced to be received in handle openings 35 near opposite ends of mandrel 22. Each end region of mandrel 22 has two thru handle openings 35 extending therethrough at a 90° angle to each other. This arrangement affords the opportunity to insert the handle 31 into openings 35 at four different angular positions 90° apart.

The remainder of the slack removing device kit illustrated in FIG. 3 consists of means to prevent the device 21 from reverse rotating after the slack has been removed from the line. The first such means shown in FIGS. 1, 2, 3 and 4 are a pair of anti-rotate pins 34. When the mandrel 22 has been rotated about its axis sufficiently to cause a selected increment of a line 36 to be wrapped around the mandrel anti-rotate pins 34 are inserted in and through opposed openings 37 in the flange plates 23. (See FIG. 1) There are a plurality of openings 37 provided around the face of each flange plate 23 so that the anti-rotate pins 34 can be inserted close to the runs of line 36 so that the device does not unwind to any great extent.

Figure 5:
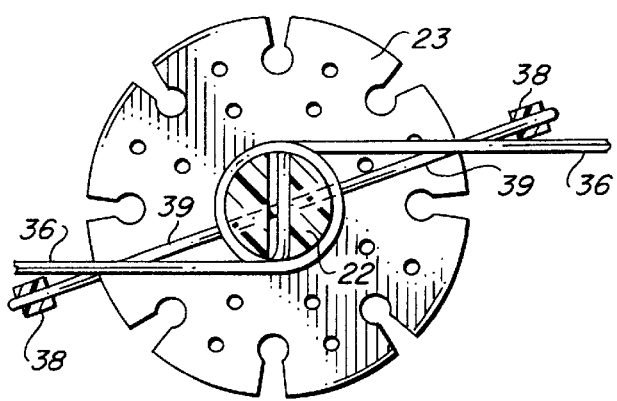
FIG. 5 is a vertical section view of the device in FIG. 1 illustrating one means for preventing the device from unwinding.
Figure 8:
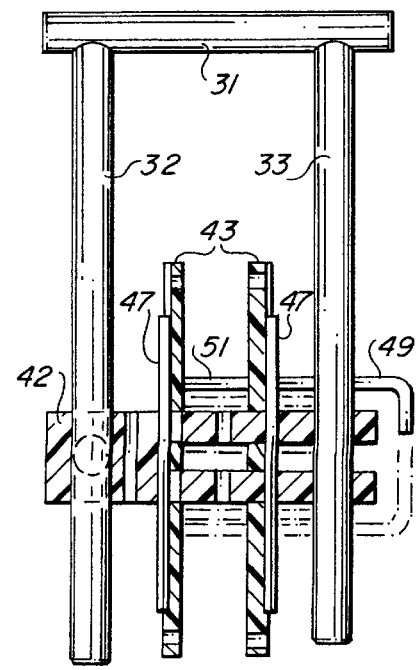
FIG. 8 is a sectional view of the device of FIG. 6 taken generally as indicated by line 8—8 in FIG. 6.
Figure 12:
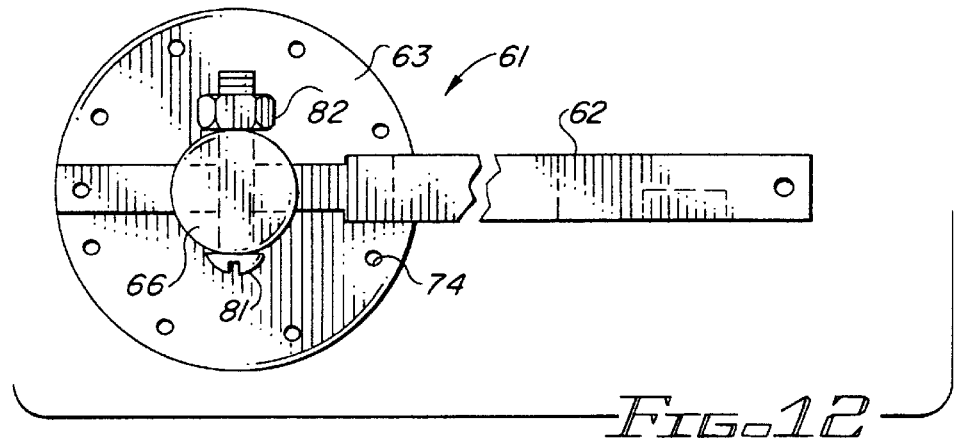
FIG. 12 is an elevational view of the device of FIG. 11.
Figure 13:
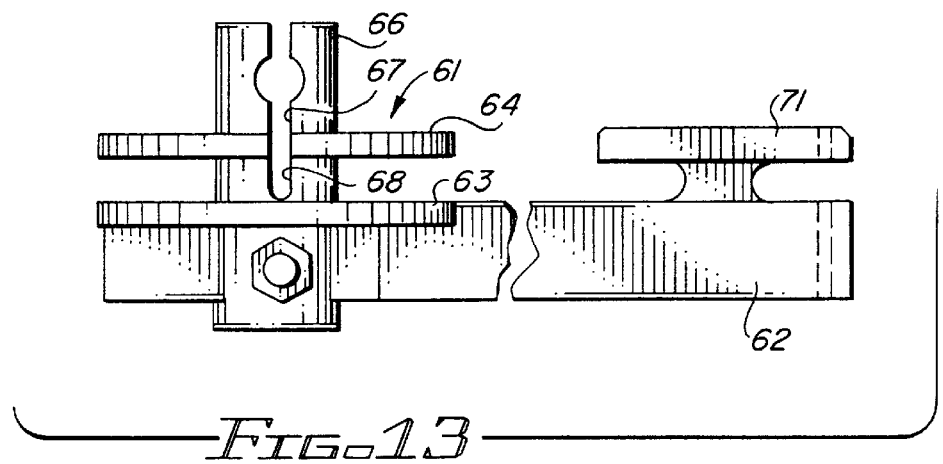
FIG. 13 is a plan view of the device of FIG. 11.

Another means provided in the kit of FIG. 3 for preventing the device 21 from reverse rotating consists of a pair of cross beams 38 having spacer legs 39 insertable into a series of openings 40 in the cross beams. FIG. 5 illustrates the manner in which the cross beams 38 rest against the line 36 with legs 39 positioned in openings 29 in the mandrel 22.

FIG. 4 illustrates the sequence of assembly and tightening of the slack removing device 21 of FIG. 1. It will be noted that in rotating the device to cause the line to be wrapped around the mandrel 22 initially only one prong 32 of handle 31 is inserted into an opening in the mandrel. This permits the handle 31 to be used as a crank to quickly rotate the mandrel to take up slack. When most of the slack in the line has been removed the handle 31 is rotated 180° around probe 32 to align the other probe 33 with an opening 35 in the other end of the mandrel. Probe 32 is preferably somewhat longer than probe 33 so that it may remain in its opening 35 as the handle is rotated to align probe 33. With both probes of handle 31 in their respective openings in the mandrel the handle 31 can be pulled or pushed to complete the final tightening of line 36.

The two pronged handle 31 when straddling the device 21 permits the tightening forces to be applied in alignment with the line. Thus, the final tightening force does not tend to twist and mis-align the slack removing device with respect to the line. This in-line application of the final turning force is particularly important in removing the slack from fairly heavy and stiff wire such as barbed wire fencing for which the tightening forces can be quite high.

FIGS. 6 through 10 illustrate another mode for carrying out the invention. Here the slack removing device is designated generally by reference numeral 41 and is assembled from the kit of components illustrated in FIG. 7. This device 41 also includes an elongated mandrel 42 and a pair of disc-like flange plates 43 adapted to be adjustably positioned on the mandrel. Mandrel 42 has a line receiving slot 44 extending from one end thereof toward the other end thereof. Mandrel 42 has a polygonal—preferably square—cross section which closely but slidingly fits into similar shaped openings 46 in flange plates 43. The kit further includes a pair of position pins 47 by which the positions of the end plates 43 can be selectively stabilized. As shown in FIGS. 6 and 9 the end plates 43 have been positioned on mandrel 42 to accept a flexible tape 48.

The kit of FIG. 7 also includes a handle 31 having two prongs 32 and 33. The handle 31 and its use in manipulating slack removing device 41 are the same as described above for device 21. See also FIGS. 6 and 8.

The kit of FIG. 7 further includes two different means for preventing reverse rotation of slack removing device 41 after the slack has been removed from the line. The first such means is U-shaped member 49 the two parallel legs 51 of which are spaced apart a distance equal to the spacing between opposite holes 52 in the faces of flange plates 43. With the legs 51 of member 49 thrust through holes 52 in both flange plates 43 these legs engage the tightened tape 48 and prevent reverse rotation of the slack removing device 41.

The second means for preventing reverse rotation of device 41 is another U-shaped wire member 53 having legs 54 sized and spaced to enter transverse holes 56 in mandrel 42. With anti-rotate member 53 positioned in mandrel 42 as shown in FIG. 10 the bit of the member 53 engages the line 57 preventing reverse rotation of the device.

The slack removing device of FIGS. 11 through 16 is designated generally by reference numeral 61 and is characterized by possessing its own removable, combination handle and rotation stop member 62. Device 61 is further characterized by having flange plates 63 and 64 which are fixed in position on a mandrel 66. Mandrel 66 and flange plates 63 and 64 may be formed integrally as by molding, casting or machining or formed separately and joined together by adhesives or by welding. The phrase "fixed on" as used herein is intended to cover all of these techniques for forming plates 63 and 64 and mandrel 66.

To permit placement of the device 61 on a line to be tightened with a segment of the line in slot 67 in mandrel 66 flange plate 64 has a transverse slot 68 therein in alignment with mandrel slot 67. With a segment of line 69 in slot 67 between the flange plates 63 and 64 the mandrel can be rotated by the handle 62 to cause segments of the line to be wrapped about the mandrel thus removing slack from the line.

When the line 69 is fully tightened a grooved retainer 71 is aligned with the line and contacts the line and prevents the device from unwinding from line tension. If desired, a securing pin 72 can be inserted through a hole 73 in the retainer 71 over the line 69 and into an aligned opening in the handle 62 to further secure the line in contact with the retainer. In this mode the handle 62 also functions as a anti-rotation stop and is left in place on the tightened line.

Figure 16:
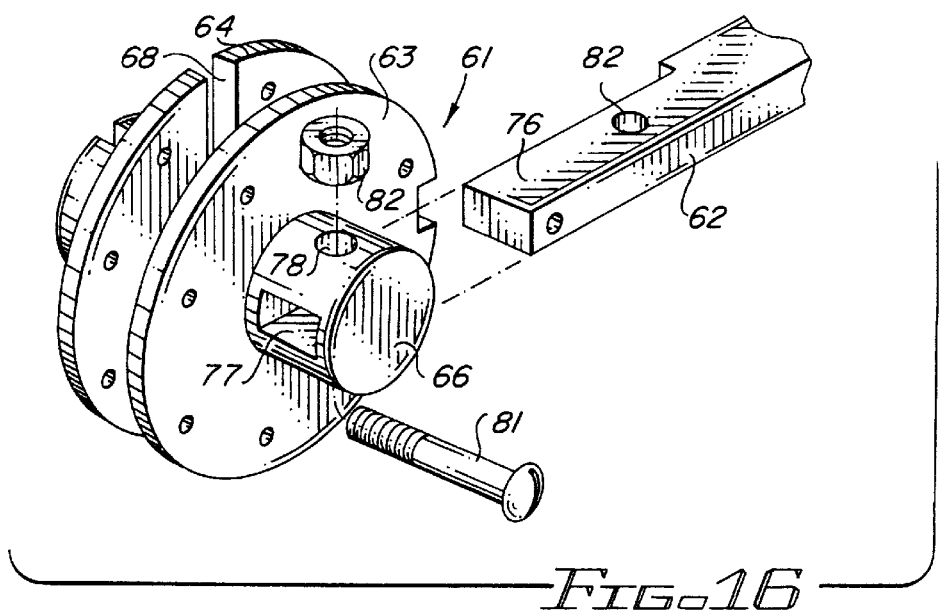
FIG. 16 is an exploded perspective view of the device of FIG. 11.

The slack removing device 61 can also be prevented from unwinding on the tightened line by inserting one or more stop pins (not shown) through aligned holes 74 in the faces of flange plates 63 and 64. In that event the handle 62 can be removed from the device 61 for reuse with another similar device. The detachable connection which permits removal of handle 62 is best illustrated in FIG. 16. A rectangular and portion 76 of handle 62 is fitted into a mating slot 77 in one end of mandrel 66. Mandrel 66 and handle end portion 76 have mating openings 78 and 79, respectively, which, when aligned permit a bolt 81 to pass therethrough. Bolt 81 is retained in place by a removable nut 82.

FIGS. 17 and 18 illustrate a very simple device 85 for removing slack from a line 86. The device 85 consists of a slotted mandrel 87 having two flange plates 88 and 89 fixed thereon. A slot 90 in end plate 89 is aligned with slot 91 in mandrel 87 and permits the device to be placed over line 86 with the line occupying space in slot 91 between flange plates 88 and 89. Device 85 can be rotated to tighten line 86 by suitable means such as the two pronged handle 31 described above. And the device can be prevented from unwinding a tightened line by the placement of one or more stop pins 92 in aligned holes 93 in the flange plates 88 and 89.

The slack removing device 85 of FIGS. 17 and 18 does not have the versatility of devices such as those designated by 21 and 41, but is more economical to produce. And when it is known which size and type of line the device is to be used on, the device at 85 is entirely adequate for its intended purpose.

Figure 20:
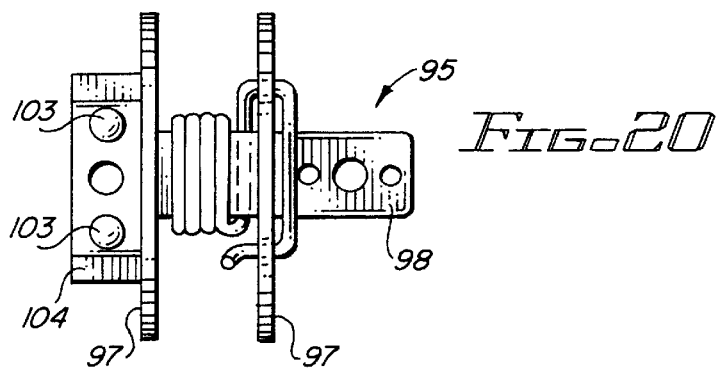
FIG. 20 is an end view of the device of FIG. 19.
Figure 19:
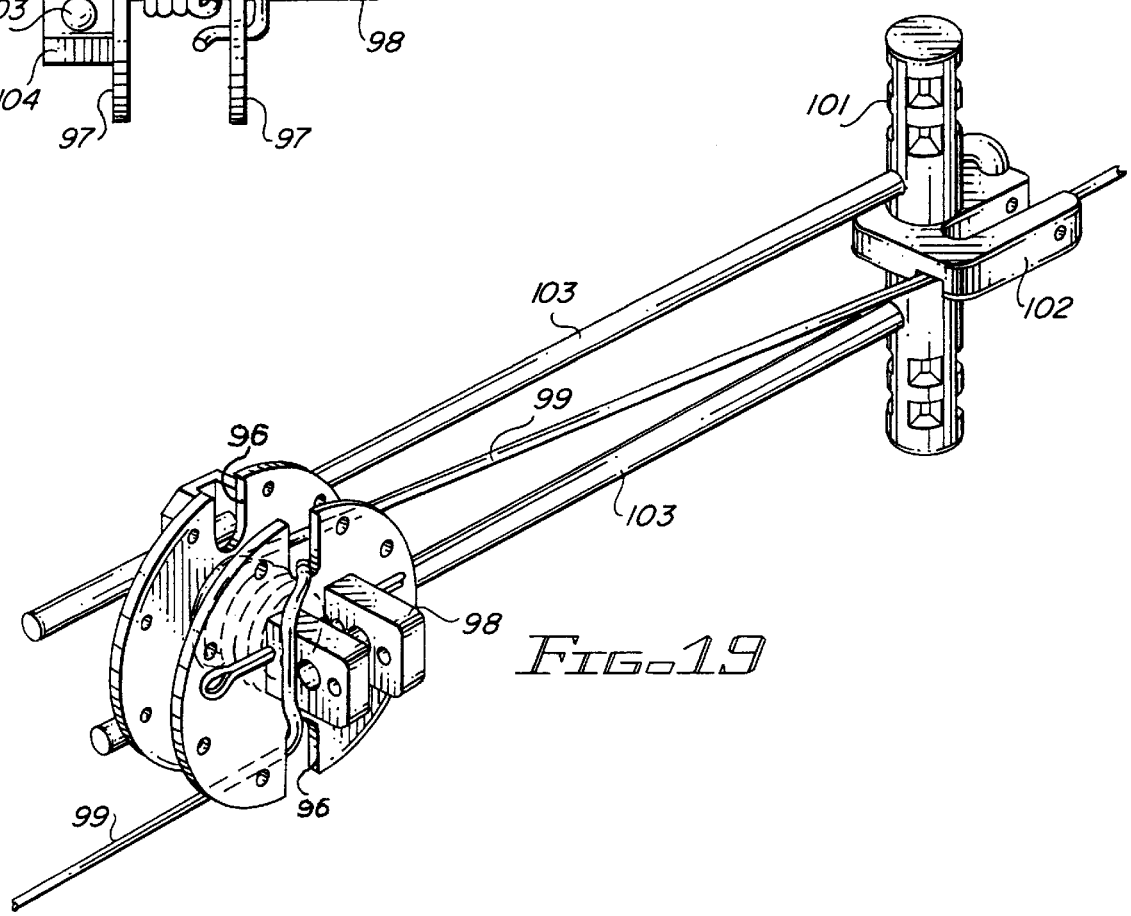
FIG. 19 is a perspective view of yet another embodiment of the slack removing device of this invention.
Figure 21:
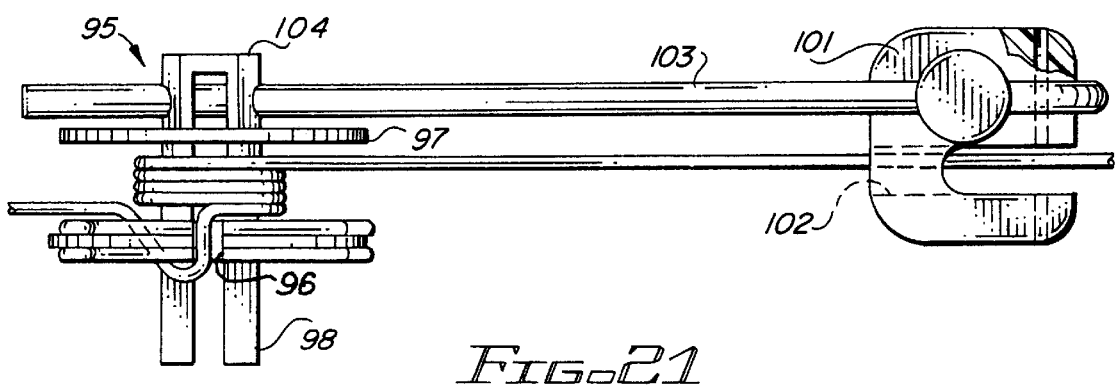
FIG. 21 is a top view of the device of FIG. 19.

Operation of the slack removing device 95 depicted in FIGS. 19–21 is similar in many respects to the previously described devices. One significant difference however resides in the provision of slots 96 in flange plates 97. Slots 96 extend from the periphery of flange plates 97 to a region of the plates near the mandrel 98. With this arrangement the line 99 from which slack is to be removed is led toward mandrel 98 and out through one of the slots 96 in a flange plate 97 across the outer face of that face plate to an opposite slot 96 and back into the space between the flange plates 97 to contact the mandrel 98. Rotation of the mandrel 98 about its axis winds increments of line 99 about the mandrel.

Slack removing device 95 may also be provided with a manipulating handle 101 which can also function as a rotation stop device. For this purpose the handle 101 is provided with a grooved retainer 102 for contacting the line 99. Twisting of the handle 101 is prevented by having both prongs 103 of the handle inserted into openings in a mandrel extension 104.

What is claimed is:

1. A device for removing slack from an elongated flexible line, said device comprising a mandrel, said mandrel being elongated and having a longitudinal axis and opposite ends, said mandrel being adapted to have the line from which slack is to be removed in contact therewith for wrapping incremental lengths of the line about the mandrel when the mandrel is rotated about said axis, a pair of spaced flange plates on said mandrel disposed transversely of the mandrel and rotatable therewith, at least one of said flange plates having oppositely extending slots extending radially from the periphery of that one flange plate to an area near the mandrel for admitting the line from which slack is to be removed to be led into and out of the space between said pair of flange plates to contact the mandrel, a transverse extension on one end of said mandrel, said extension having a pair of handle prong receiving openings extending parallel to said flange plates and spaced equidistant from said longitudinal axis of the mandrel, and a handle for rotating the mandrel, said handle having a pair of prongs thereon spaced apart the same distance as the prong receiving openings in said transverse extension, whereby the prongs on said handle can be inserted in the prong receiving openings in said extension.

2. The slack removing device of claim 1 wherein said handle has a retainer member thereon for contacting the line from which slack is removed to prevent rotation of the mandrel.

3. A device for removing slack from an elongated flexible line, said device comprising a mandrel, said mandrel being elongated and having a longitudinal axis and opposite ends, said mandrel being adapted to have the line from which slack is to be removed in contact therewith for wrapping incremental lengths of the line about the mandrel when the mandrel is rotated about said axis, a pair of spaced flange plates on said mandrel disposed transversely of the mandrel and rotatable therewith, a transverse extension on one end of the mandrel, said extension having a pair of handle probe receiving openings extending parallel to said flange plates and spaced equidistant from said longitudinal axis of the mandrel, a handle for rotating the mandrel, said handle having a pair of prongs thereon spaced apart the same distance as the prong receiving openings in said transverse extension whereby the prongs on said handle can be inserted in the prong receiving openings in said extension.

4. The slack removing device of claim 3 wherein said handle has a retainer member thereon for contacting the line from which slack is removed to prevent rotation of the mandrel.

* * * * *